US007044332B2

(12) United States Patent
Giegerich et al.

(10) Patent No.: US 7,044,332 B2
(45) Date of Patent: May 16, 2006

(54) PRODUCT CONTACT SENSOR FOR AN ARTICLE HANDLER

(76) Inventors: David K. Giegerich, 540 Westwood Ave., River Vale, NJ (US) 07675; Munroe Chirnomas, 47 Sky Lime Dr., Morris Township, NJ (US) 07960

( * ) Notice: Subject to any disclaimer, the term of this patent is extended or adjusted under 35 U.S.C. 154(b) by 425 days.

(21) Appl. No.: 10/402,175

(22) Filed: Mar. 27, 2003

(65) Prior Publication Data

US 2003/0208920 A1 Nov. 13, 2003

Related U.S. Application Data

(60) Provisional application No. 60/368,111, filed on Mar. 27, 2002.

(51) Int. Cl.
*B65G 59/00* (2006.01)
*B65H 3/08* (2006.01)
*G07F 11/00* (2006.01)

(52) U.S. Cl. .............................. 221/278; 221/4; 221/9; 221/13; 901/40; 414/737

(58) Field of Classification Search ................ 221/278, 221/9, 13; 901/40; 414/737, 744.8, 752.1; 294/64.1
See application file for complete search history.

(56) References Cited

U.S. PATENT DOCUMENTS

| | | | | | |
|---|---|---|---|---|---|
| 3,881,528 | A | * | 5/1975 | Mackenzie | 141/52 |
| 4,976,376 | A | * | 12/1990 | Williams | 221/24 |
| 5,468,110 | A | * | 11/1995 | McDonald et al. | 414/273 |
| 5,513,772 | A | * | 5/1996 | Glaser | 221/211 |
| 5,855,374 | A | * | 1/1999 | Shoemaker, Jr. | 273/447 |
| 5,880,443 | A | * | 3/1999 | McDonald et al. | 235/375 |
| 5,967,892 | A | * | 10/1999 | Shoemaker, Jr. | 463/7 |
| 6,547,096 | B1 | * | 4/2003 | Chirnomas | 221/123 |
| 6,770,001 | B1 | * | 8/2004 | Shoemaker, Jr. | 473/447 |
| 6,786,355 | B1 | * | 9/2004 | Chirnomas | 221/9 |
| 6,840,399 | B1 | * | 1/2005 | Chirnomas | 221/7 |
| 6,868,983 | B1 | * | 3/2005 | Chirnomas | 221/13 |
| 6,939,088 | B1 | * | 9/2005 | Farrell | 406/192 |

FOREIGN PATENT DOCUMENTS

WO WO 01/96142 A2 * 12/2001

* cited by examiner

*Primary Examiner*—Donald P. Walsh
*Assistant Examiner*—Michael Butler
(74) *Attorney, Agent, or Firm*—Lawrence C. Edelman

(57) ABSTRACT

A product contact sensor of the type shown and described herein.

6 Claims, 4 Drawing Sheets

PRODUCT CONTACT SENSOR FOR AN ARTICLE HANDLER

CROSS-REFERENCE TO RELATED APPLICATIONS

This application claims priority under 35USC 120 of U.S. Provisional Patent Application No. 60/368,111 filed Mar. 27, 2002, entitled "Product Contact Sensor For An Article Handler". The entire disclosure of this patent application is incorporated herein by reference in its entirety.

BACKGROUND OF THE INVENTION

The environment of the present invention is a refrigerated vending machine of the type, for example, as described in issued U.S. Pat. No. 5,240,139 entitled Package Vending Machine, issued on Aug. 31, 1993 to Munroe Chirnomas, incorporated herein in its entirety by reference. This type of vending machine includes a cabinet having the conventional equipment associated therewith needed for accomplishing vending, such as a user article selection and payment system, an article storage area and an article dispensing mechanism. In the forenoted US patent, the article dispensing mechanism includes an article pickup head which engages and becomes secured to the articles to be dispensed by use of suction coupled to the pickup head via an air hose. A product contact sensor is described in the forenoted patent, however the present invention is directed to a further embodiment of a product contact sensor useful in such environments, as well as a more general environment wherein article handling is provided.

It is desired that the product contact sensing be accomplished by a mechanism which will:

- Reliably and with minimal physical impact upon the article to be handled, quickly provide a signal indicating the occurrence, or imminent occurrence, of product contact.
- Reliably reposition itself so as to be ready for the next indication of product contact,
- provide a convenient way for conducting the signal wire from the contact sensor to the control portion of the article handler.
- Provide the above operation and a manner which is relatively immune to the accumulation of dust, dirt, etc.

SUMMARY OF THE INVENTION

The present invention provides a novel product contact sensor for use, for example, in a vending machine. Although a vending machine embodiment is disclosed as the preferred embodiment, the article handler is not required to be in a vending machine and could be in a more general environment. Furthermore, although the article handler of the illustrated embodiment is of the type using suction for securing to the article to be handled other types of securing and engaging force and mechanisms could be used with the product contact sensor of the present invention.

BRIEF DESCRIPTION OF THE DRAWINGS

The accompanying drawings, which are incorporated herein and constitute part of this specification, illustrate embodiments and details of the invention, and, together with the general description given above and the detailed description given below, serve to explain the features of the invention.

DETAILED DESCRIPTION OF THE PREFERRED EMBODIMENT

Figure 1:
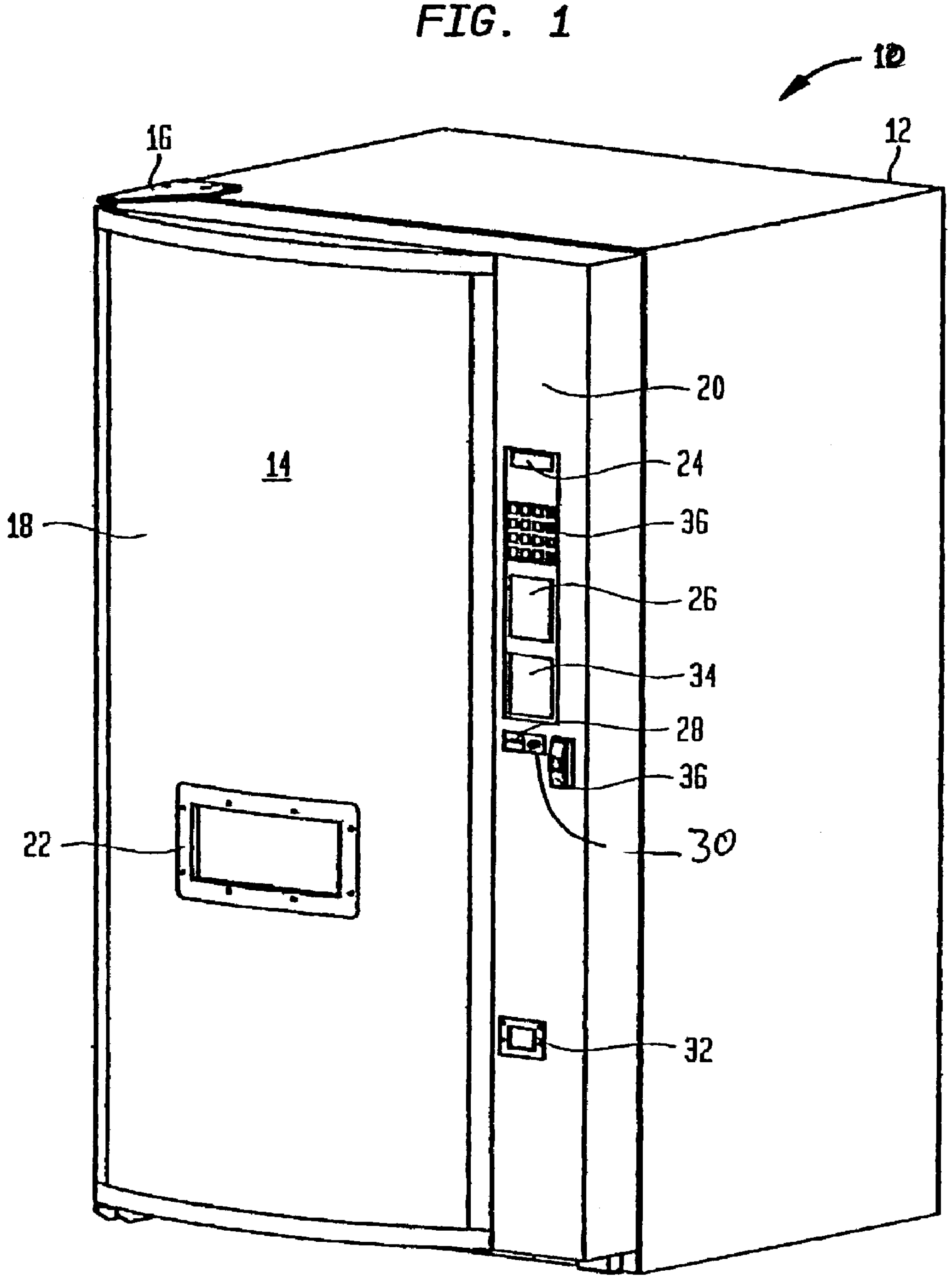
FIG. 1 illustrates a front perspective view of a vending machine useful as an environment for the product contact sensor of the present invention.
Figure 2:
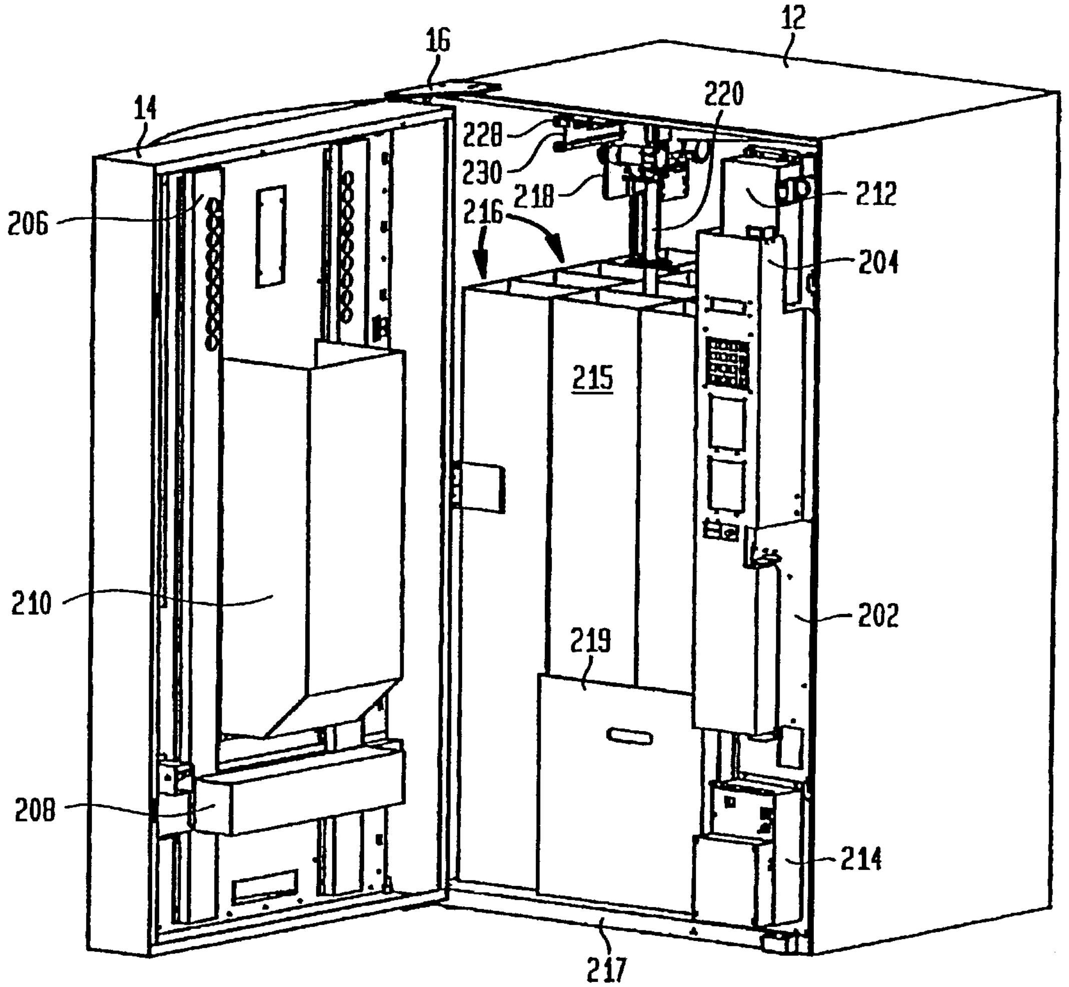
FIGS. 2 and 3 are front perspective views of the vending machine of FIG. 1, with the front door opened, so as to illustrate the main mechanical and electrical components therein.
Figure 3:
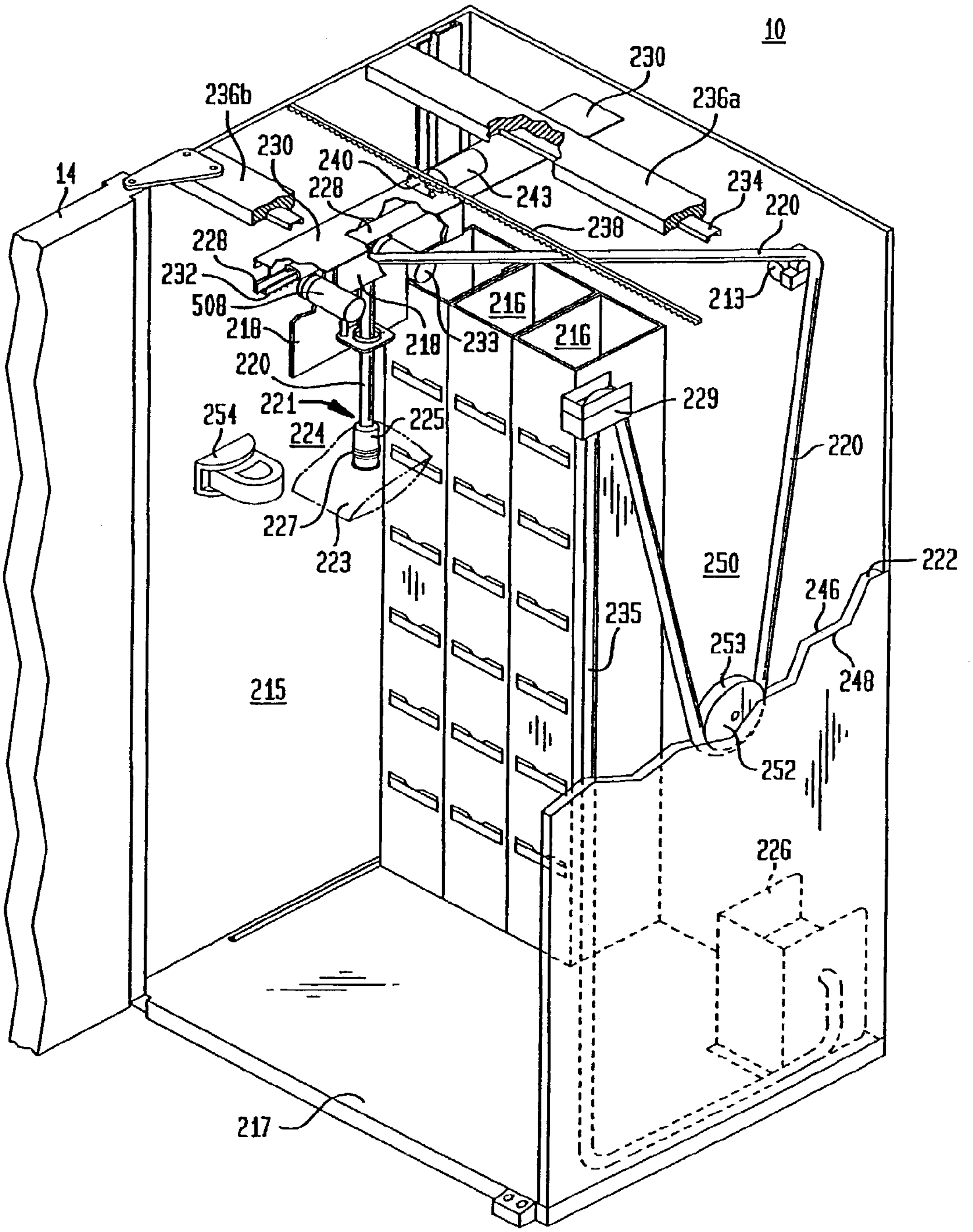

FIGS. 1–3 describe a vending machine environment 10 for the product contact sensor of the present invention. As shown and described therein, vending machine 10 includes an article pickup head 224 which engages and becomes secured to the articles to be handled using suction. The present invention is directed to a product contact sensor useful in such environments, as well as a more general environment wherein article handling is provided.

More specifically, FIG. 1 illustrates an environment for product contact sensor of the invention described herein, in the form of an article dispenser, such as a point-of-sale (POS) dispenser. Although throughout the following description, reference is made to implementation of the inventive product contact sensor in a vending machine environment, it is intended that the term "vending machine", and in fact the environment for the present invention, include more general purpose article handling, retrieval and/or dispensing apparatus, as well as POS equipment. Such equipment, if embodied as a portable device may comprise and be about the size of a traditional vending machine or as large as a tractor-pulled trailer, and if embodied as a non-portable device may comprise and be embodied as an automated dispensing room or an area located in a permanent structure, such as in a building (aboveground or underground, and with or without interior walls or an enclosing cabinet). Furthermore, it is intended that the term "articles" or "products" include in at least some of the embodiments of the invention described herein, not only goods, but also services and/or information, in either a permanent or temporal form.

Accordingly, FIG. 1 illustrates a perspective view of a vending machine 10, comprising one embodiment for an apparatus which is constructed and operates according to the present invention. Vending machine 10 includes a main cabinet 12 and a front door 14 mounted on a hinge 16 for providing access to the interior of the vending machine for servicing (refilling it with articles, maintenance, etc.). Note, in a further vending machine embodiment, a service door or port could be positioned anywhere on or as a part of cabinet 12. In FIG. 1, front door 14 is shown in a closed position, forming an enclosure with main cabinet 12, within which various components of vending machine 10 are housed, as explained in more detail below.

Front door 14 includes a convex-shaped section 18 adjacent a flat section 20; however, these particular shapes are not necessary to the invention. The convex-shaped section 18 comprises a translucent plastic display panel 18, which typically has brand name and/or logo graphics displayed thereon, and may even include graphics which illustrate the individual articles that are vendible by vending machine 10, as well as the price and/or selection information for the articles. Panel 18 is typically back-light using fluorescent bulbs, not shown.

A customer retrieval area 22 is formed in the panel 18 on door 14 so that articles stored therein can be discharged to a user of vending machine 10. Although one customer retrieval area 22 is shown, it will be apparent from further description that the article handling apparatus of the present invention, in a further embodiment, could just as easily dispense articles to multiple customer retrieval areas.

Various user interface components are mounted on flat section 20 of door 14. A customer display 24 may be a conventional fluorescent or LED display panel for displaying various items of information to a user of machine 10, such as feedback to the user of the selection made, the amount tended, and if the product is sold out or being vended. For accepting payments, a bill acceptor slot 26 accepts paper money into a conventional bill acceptor mechanism (mounted inside machine 10 so as to have its user interface portion extend through an aligned opening in flat section 20) for purchasing articles or for making change. A coin insertion slot 28 accepts coins into a conventional coin changer (also mounted inside machine 10 so as to have its user interface portion extend through an aligned opening in flat section 20) for purchasing articles or for making change. A coin return actuator 30 comprises a conventional push-button mechanism for activating a coin return portion of the coin changer mechanism which, upon actuation returns coins inserted by the current user, to a coin return well 32. The coin return portion of the coin changer mechanism also provides change to the coin return well 32 either in response to the purchasing of articles or for making change for paper money or larger coins. A credit/debit card slot 34 accepts a plastic credit/debit card inserted into a conventional card reader mechanism (also mounted inside machine 10 so as to have its user interface portion extend through an aligned opening in flat section 20) for allowing a user to pay for purchases via credit/debit cards. A door lock mechanism 36 enables front door 14 to be secured so that it cannot be opened without a key. For allowing user selections, display panel 18 may include graphics, as noted above, which indicates the various articles vendible by the machine, as well as their associated price and unique selection number. In a further embodiment, flat section 20 could include a group of graphic article displays and their associated price. A conventional keypad push-button mechanism 38 is provided for enabling a user to select a desired article from vending machine 10. In a further embodiment, push-button mechanism 40 could include individual push buttons for each article selection, as well as an associated price display; and even furthermore, a user operated touch screen could replace pushbutton mechanism 40 and display 24. Although not shown in FIG. 1, machine 10 also includes a conventional telecommunications component that can be used for authenticating credit card purchases, as well as other uses relating to machine control and reporting the inventory and operational status of machine 10 to a remote location, as more fully described later on. Although vending machine 10 is illustrated to include the above described user interface components, in a more minimal embodiment of the invention, most, if not all, of these user interface components could be omitted, and the dispenser could in fact be controlled from a remote location, with or without a local payment system.

FIGS. 2 and 3 are front perspective views of the vending machine of FIG. 1, with the front door open, so as to illustrate the main mechanical and electrical components therein. Note, some portions of vending machine 10 are shown in these FIGURES cut away in order to better illustrate the interior components.

Referring first to FIG. 2, it is noted that the right portion of the front of cabinet 12 includes a vertically mounted support panel 202 which is used for mounting most of the user interface components. More specifically, a hinged mounting bracket 204 is mounted on panel 202 and aligned with an opening in door 14 so that the user interface components, such as the selection button keypad 40, coin insertion slot 30, bill acceptor slot 28, coin return 32, and customer display 24, are all accessible to the user from the front side of door 14. For backlighting panel 18, two fluorescent bulb light sources (other numbers of light sources can be used), are mounted on the interior of front door 14 behind protective covers 206. Also mounted on the interior of front door 14 is a ballast 208 for the fluorescent bulbs, and a product delivery chute 210. Note that product delivery chute 210 is unconventional in that it is extremely tall, and therefore serves as a security measure to prevent unauthorized access into the machine by insertion of an arm or other grasping mechanism into the customer retrieval area 22 from outside the machine. In typical prior art vending machines, a swinging security door is usually found at the top of chute 210, which swings into in a vandal blocking position when the customer pushes in the swinging door at the entrance to the product retrieval area 8. In a further embodiment of vending machine 10, such a security door could be used in conjunction with product delivery chute 210, especially if chute 210 is not as tall as the one illustrated in FIG. 2 and also if the product retrieval area 8 is located higher up on machine 10. Mounted behind hinged mounting bracket 204 is a conventional bill acceptor mechanism for causing paper money inserted into bill acceptor slot 28 to be drawn into vending machine 10, a conventional coin changer for supplying coins to coin return slot 34, and a conventional bill validator for ascertaining proper insertion of paper money into bill acceptor slot 28.

A control board 212 comprises a printed circuit board on which circuitry is formed and to which integrated circuit chips are attached. Control board 212 includes a microprocessor that is electrically connected to various sensors, motors, the above described user interface elements, as well as other devices within vending machine 10, to control the operation of vending machine 10 as described herein. When reference is made in this description to performance of specified functions by control board 212, it is to be understood that these functions are controlled by the microprocessor and the associated circuitry formed on control board 212. A power supply 214 is mounted on panel 202 and supplies power for the electrical components of vending machine 10.

Referring now also to FIG. 3, it is apparent that the bulk of the interior of cabinet 12 is available as an article storage area 215. In the illustrated embodiment, a plurality of vertically aligned article storage bins 216 are arranged on the interior floor 217 of cabinet 12, for storing articles 223 to be vended by machine 10. In a refrigerated environment for the present invention the bins could be arranged to sit on a shelf positioned above the refrigeration system.

An opened-top container 219 can be dimensioned to hold a plurality of article storage bins 216 therein, and used, for example to facilitate the simultaneous handling (i.e., removal, installation and transportation) of the plurality of bins 216 into/out of the article storage area 215. Container 219 also facilitates rapid and accurate positioning of a plurality of the article storage bins into the storage area of the article handling apparatus. A carriage 218 (which may be more generally referred to as an X-Y or planar positioning mechanism) is coupled to the interior topside of cabinet 12 and adapted for being controllably positioned by the control board portion 212 of machine 10, to a location centered over (so as to be aligned with) the open top-end of a selected one of article storage bins 216.

Although vertical alignment of the article storage bins 216 is shown, non-vertical, i.e., slanted or even horizontal alignment is also be possible. Furthermore, although article storage bins 216 are shown to be in an ambient environment, bins 216 could in fact the positioned in a freezer which is located in the bottom of storage area 217, such as shown and described in the forenoted U.S. Pat. No. 5,240,139 or the entire storage area may be located in a refrigerated environment.

In the environment of the present invention, an air hose 220 is continuous from a point before it's exit from a hose storage area 222 over orthogonally positioned rollers 213 (or other low-friction arrangement), to its free end 221. Free end 221 includes a weighted portion 225 in combination with a bellows extension tip portion 227. Depending upon the physical characteristics of the articles to be dispensed, article pickup head 224 may comprise only the weighted portion 225, or this portion in combination with a fitting specifically adapted to the type of packages to be dispensed, such as the bellows tip 227 (serving as an active suction cup) or a compliant tip without a weight. Hose 220 has one end coupled to a source of negative air pressure, i.e., suction, which source of suction comprises in the preferred embodiment a blower motor 226, and a free end coupled to the article pickup head 224. In the present invention, the word continuous is intended to mean a hose which is connected and acts between it's end points, in order to accomplish the functions required by it, as a unitary/single hose, i.e., one than one hose can be coupled together to act as a single hose. An air hose portion 235 provides suction from blower motor 226 to one port of an air junction box 229, while continuous hose 220 is connected to a second port of air junction box 229.

A linkage arrangement is used, for example, for activating air junction box 229. In the illustrated embodiment air junction box 229 is included at a top portion of hose storage area 222, and includes an airflow sensor and vacuum breaker assembly which is activated using the linkage arrangement. The airflow sensor is used to develop a signal which is applied to the controller of the vending machine and is representative of the airflow through air hose 220. The vacuum breaker assembly is used to quickly bring the air pressure in hose 220 to the ambient pressure, thereby facilitating a "quick-release" of an article transported by the article pickup head, into the dispensing chute 210. It is noted that a quick release of the products does not have to occur at the top of dispensing chute 210, and in the event that it is desirable to avoid subjecting the article to forces which result from jarring or dropping, the article pickup head could proceed to the bottom of the dispensing chute 210 before providing release of the article, with or without the use of the quick release valve. In one embodiment, the airflow sensor arrangement may comprises a two-part switch, a first part includes a reed switch mounted on a top portion of box 229, and a second part includes a magnet mounted at the free end of a swinging arm mounted inside box 229. As the arm swings inside box 229 due to changes in airflow, the switch is "toggled", thereby indicating changes in airflow. The use of this airflow signal will also be described in greater detail later. In an further embodiment, the functions of the airflow valve and quick release could be built into the blower motor enclosure. With this arrangement, hose 220 would be continuous from the picker head all of the way to the blower motor.

Figure 4:
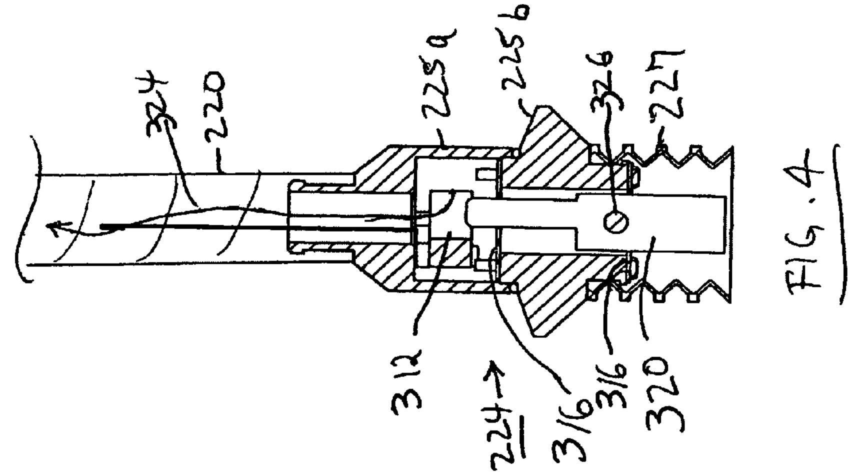

Referring now to FIG. 4 herein, pickup head 224 includes a weighted portion 225 comprising separable pieces **225*a* and 225*b*. Pieces 225*a* and 225*b* are separable in order that the article contact sensor of the present invention can be easily assembled using attachment techniques well known to those of ordinary skill in this technology. Mounted inside an opening 312 inside piece 225*a* is a magnetically operated reed switch package 314 of conventional design, illustrated more clearly in the top view of FIG. 6** herein.

Figure 6:
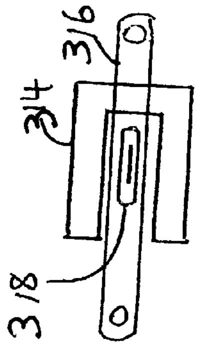
FIG. 6 illustrates the main components of the invention from a top view formed by a section 6—6 illustrated in FIG. 5.
Figure 7:
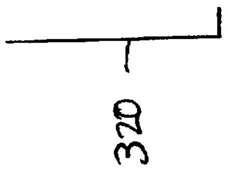
FIG. 7 illustrates a side view of a contact portion of the product contact sensor mechanism which is constructed and operates in accordance with the illustrated embodiment of the present invention.

Mounted at the upper and lower ends of piece **225*b* are guide plates 316, also shown more clearly in the top view of FIG. 6. Guide plates 316 include a centrally located slot 18 through which an upper portion 322 of a contact plunger 320** is constrained for vertical movement therebetween.

FIG. 4 illustrates a side view of contact plunger 320. The bottom "L" portion of contact plunger 320 is constructed so as to contact, but not damage upon such contact, an article to be handled. Alternative shapes and additional adding, etc. is possible for the contact end of contact plunger 320. The extent and vertical movement of plunger 320 is controlled by the spacing between the bottom "L" portion thereof and a screw 326 position therein.

Figure 5:
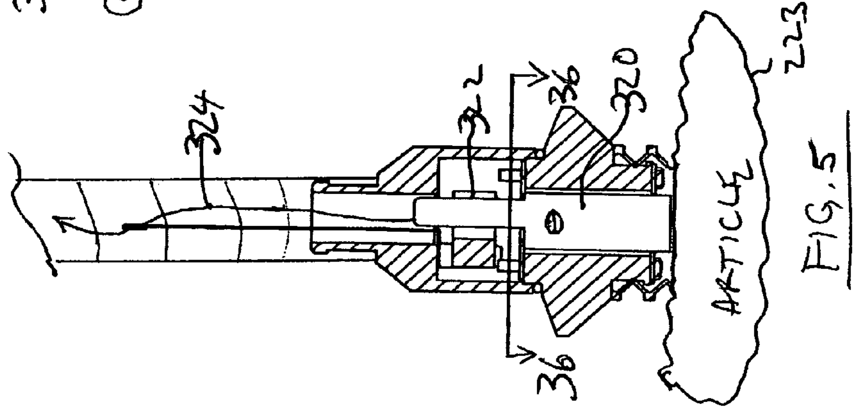
FIGS. 4 and 5 illustrate a side section view of a product contact sensor mechanism which is constructed and operates in accordance with one embodiment of the present invention, at two different times during its operation.

Referring now simultaneously to FIGS. 4 and 5, FIG. 4 illustrates the position of plunger 320 in a state ready to indicate contact with a product, and FIG. 5 illustrates the position of plunger 320 in a state where it indicates contact with the product. Product contact is indicated by the sensor upon the upper portion 322 substantially protruding in the space between the opposed legs of magnetic reed switch 314, causing it to either "open" or "close" the switch portion of sensor 314.

Accordance with one aspect of the present invention the electrical wire 324 which conducts the product contact signal to the control portion of the article handler is positioned inside air hose 220 so as to remain out of the way of the moving portions of the article handling mechanism, yet still have the ability to have exactly the same freedom of movement as movement of the pickup head 224. Such routing of wire 324 tends to avoid excess strain thereon, and thereby provides long life for the wire, and an exceptionally reliable operation for the contact sensor. The remote end of wire 324 can exit air hose 220 at, for example, the junction box 229 shown in FIG. 3.

A further advantage of the present arrangement is that product contact plunger 20 reliably operates with only a minimum force. That is, it is extremely lightweight and constrained within pickup head 224 so as to be freely movable in the article direction. In an alternative embodiment, however, it may be desirable to include a spring force to provide some urging resistance to the movement of plunger 320.

An even further advantage of the present arrangement is that the sensor 314 is a sealed package and therefore provides extremely reliable operation.

In an alternative embodiment, a different type of sensor could be used, such as a hall effect sensor.

The present invention as described above provides a novel product contact sensor for use with an article handler, for example, in a vending machine, although it is noted that other environments and types of article handlers are also appropriate for the invention. For example, an article handler which uses a "claw" could also benefit from a product contact sensor of the present invention.

While the present invention has been disclosed with reference to certain embodiments, numerous modifications, alterations and changes to the described embodiments are possible without departing from the sphere and scope of the present invention, as defined above.

Accordingly, it is intended that the present invention not be limited to the described embodiments, but that it has a full scope as defined by the above language and its equivalents as would be apparent to one of ordinary skill in this technology.

The invention claimed is:

1. An article retrieving apparatus, comprising:

a storage area (11) for storing articles along at least one longitudinal axis;

an article extracting device (14) comprising an air hose (21, 23, 26) including a free end (28) for selectively becoming adhered to for extracting an article from the storage volume via suction in said air hose created by a negative air pressure source (20) coupled to said air hose;

a positioning mechanism (12) coupled to the air hose and responsive to control signals for positioning the free end thereof in alignment with a said longitudinal axis;

a drive mechanism (190) coupled to said air hose for moving the free end thereof in axial alignment with the longitudinal axis in the storage volume; and control apparatus for initiating an article retrieving operation, and generating control signals which are applied to said positioning mechanism and said drive mechanism for causing controlled movement of the article extracting device so that a selected article is extracted from the storage volume by the free end of said hose and placed in an area for being retrieved;

wherein the free end of said hose includes a product contact sensor, comprising:

a weight having one end attached to said hose, and an air passage formed axially therethrough, said air passage having a diameter which is sufficient for allowing substantially all said suction to be conducted to an other end of said weight, said other end being axially opposed to the one end;

a movable element mounted within the axial air passage formed in the weight, said element being positioned in the passage so as to extend beyond the other end of the weight and contact an article to be retrieved, said contact tending to move said element in an axial direction within the air passage, a sensor mounted on said weight for generating an electrical signal representative of the sensing of movement of said movable element in response to contact of said movable element with an article to be retrieved, and a electrical signal conductor coupled to said sensor for conducting said electrical signal from said sensor to said control apparatus, said electrical signal conductor being routed so as to pass through said air hose on its way to said control apparatus.

2. The article retrieving apparatus of claim 1, further including a suction cup mounted to said other end of said weight so as to surround the air passage in the weight and the moveable element, where an article contacting portion of the suction cup extends from the other end of the weight so that movement of the moveable element in response to contact with an article to be retrieved, does not occur until after the article contacting portion of the suction cup has made contact with the article to be retrieved.

3. The article retrieving apparatus of claim 2 wherein said suction cup comprises a cylindrical shape.

4. The article retrieving apparatus of claim 3 wherein said suction cup comprises a flexible material having pleated side walls.

5. The article retrieving apparatus of claim 1, wherein said moveable element comprises a metallic blade and the sensor comprises a magnetically operated reed switch.

6. The article retrieving apparatus of claim 5, wherein one end of the metallic blade is adapted to make contact to an article to be retrieved, and an opposed end of the metallic blade is positioned adjacent an operative area of the reed switch, so that upon movement of the metallic blade due to contact with an article to be retrieved, the opposed end of the metallic blade moves within the operative area of the reed switch, thereby causing the generation of said electrical signal.

* * * * *